United States Patent [19]

Samuel et al.

[11] Patent Number: 5,186,991

[45] Date of Patent: Feb. 16, 1993

[54] CONTAINER CLOSURES, SEALED CONTAINERS AND SEALING COMPOSITIONS FOR THEM

[75] Inventors: David N. Samuel, Great Gransden; Richard S. Williams, Impington, both of England

[73] Assignee: W. R. Grace & Co.-Conn., New York, N.Y.

[21] Appl. No.: 718,931

[22] Filed: Jun. 7, 1991

Related U.S. Application Data

[63] Continuation of Ser. No. 370,546, Jun. 23, 1989, abandoned.

[30] Foreign Application Priority Data

Jun. 29, 1988 [GB] United Kingdom ................ 8815487
Aug. 26, 1988 [GB] United Kingdom ................ 8820283

[51] Int. Cl.$^5$ ...................... B65D 41/00; C08L 23/04; C08L 23/16; C08L 53/02
[52] U.S. Cl. .................. 428/35.8; 428/36.6; 428/64; 525/57; 215/316
[58] Field of Search ............ 525/57; 428/35.8, 36.6

[56] References Cited

U.S. PATENT DOCUMENTS

| | | | |
|---|---|---|---|
| 3,857,754 | 12/1974 | Hirata et al. | 161/227 |
| 3,931,449 | 1/1976 | Hirata et al. | 428/474 |
| 3,975,463 | 8/1976 | Hirata et al. | 260/897 B |
| 4,293,473 | 10/1981 | Eastman | 525/57 |
| 4,568,529 | 2/1986 | Leconte | 428/325 |
| 4,657,971 | 4/1987 | Shiraki et al. | 525/57 |
| 4,657,972 | 4/1987 | Giles et al. | 525/57 |
| 4,806,597 | 2/1989 | Gallucci et al. | 525/57 |
| 5,024,897 | 6/1991 | Mason et al. | 525/57 |
| 5,043,383 | 8/1991 | Eaton | 525/57 |
| 5,045,594 | 9/1991 | Samuel et al. | 525/57 |
| 5,089,353 | 2/1992 | Negi et al. | 525/57 |

FOREIGN PATENT DOCUMENTS

| | | |
|---|---|---|
| 0129309 | 12/1984 | European Pat. Off. . |
| 129309 | 12/1984 | European Pat. Off. . |
| 0129310 | 12/1984 | European Pat. Off. . |
| 0142183 | 5/1985 | European Pat. Off. . |
| 0153042 | 8/1985 | European Pat. Off. . |
| 0182674 | 5/1986 | European Pat. Off. . |
| 62-263250 | 11/1987 | Japan . |
| 1112025 | 5/1968 | United Kingdom . |
| 2084600 | 4/1982 | United Kingdom . |
| 2084601 | 4/1982 | United Kingdom . |
| 2197634 | 5/1988 | United Kingdom . |

Primary Examiner—Carman J. Seccuro, Jr.
Attorney, Agent, or Firm—John Dana Hubbard; William L. Baker

[57] ABSTRACT

A sealing composition for a container closure comprises a polymeric matrix material and its oxygen permeability is reduced by incorporating ethylene vinyl alcohol polymer into the composition. The composition can be in fluid or meltable form ready for application to a closure or it can be present as a deposit on the closure, for instance a gasket around the closure.

18 Claims, No Drawings

CONTAINER CLOSURES, SEALED CONTAINERS AND SEALING COMPOSITIONS FOR THEM

This is a continuation of application Ser. No. 07/370,546 filed Jun. 23, 1989, now abandoned.

This invention relates to materials that can be used to improve the shelf life of packaged materials, such as bottled beer.

It is standard practice to form containers from materials that are impermeable to oxygen, such as glass or metal, or of very low permeability, such as laminated polymeric material including a barrier layer that may be formed of, for instance, a blend of polypropylene and ethylene vinyl alcohol (see for instance EP 142183). It is also known from U.S. Pat. Nos. 3,857,754 and 3,975,463 to form articles such as bottles from certain compositions that include certain saponified ethylene-vinyl acetate copolymers.

When the container is formed of a glass or metal body and is provided with a metal closure, then permeation of oxygen or other gas through the body and the closure is impossible because of the impermeability of the materials from which the body and closure are formed. However it has long been recognised that when conventional containers of this type are used for the storage of materials such as beer, the shelf life of the stored materials is very limited due to the ingress of gases. For instance the quality of the beer stored in glass bottles having metal caps tends to deteriorate after storage for a month or so.

Although ingress of oxygen is a main cause of deterioration of beer, off-flavours can also arise when the container is exposed to an atmosphere containing other gases that can give an unpleasant flavour. For instance the containers are sometimes packed on pallets or in crates made of wood that has been impregnated with a preservative that may result in the atmosphere being contaminated with chloroanisole and it is necessary to prevent ingress of this.

The most effective way of prolonging the storage life has been to provide a gasket of cork and aluminium foil between the closure and the container body but this is wholly uneconomic. Accordingly at present it is accepted that the shelf life of beer, especially in bottles, is rather limited.

It would be very desirable to be able to improve the shelf life significantly whilst continuing to use conventional materials for the formation of the container body, the container closure and the gasket between the body and closure.

A fluid or meltable composition according to the invention is suitable for being applied on to, and solidifed on, a container closure and comprises a polymeric matrix material, and the oxygen permeability of the composition (measured on a deposit formed from the composition on a container closure) has been reduced by incorporation of ethylene vinyl alcohol polymer into the composition.

The invention includes container closures carrying a solid deposit formed on the closure from such a composition and that is positioned to seal around, or over a line of weakness in, the closure.

The solid deposit can be a gasket deposited around the closure and formed from the composition. Instead of, or in addition to the deposit being such a gasket, the deposit can (less preferably) be deposited on the inner face of a closure at a position where there is a discontinuity or line of weakness around a push or pull component for opening a container sealed by the closure. The closure occupies, as is conventional, only a minor part of the exposed surface area of the closed container, often less than 25% of the surface area. Thus the area of the solid deposit can be very small relative to the area of the container. Despite this, the invention can give greatly improved storage stability.

The invention also includes filled containers sealed with such closures. The sealed container comprises a container body, the closure fitted on it, and the filling that is contained within the container body. The container body is preferably of glass or metal. The closure is preferably of metal.

The filling can be any beverage, foodstuff or other material that is to be stored within the container but the invention is of particular value when the filling is a material whose shelf-life is normally restricted due to contamination, during storage, by oxygen. In particular, the invention is of value when the filling is beer.

The container body can be a can, generally of metal, in which event the closure is a can end. Generally the entire closure is of metal but the panel of the closure can include a removable (generally pull) component of polymeric material.

Preferably however the container is a jar or bottle provided with a cap. The jar or bottle can be of polymeric organic material such as polyethylene terephthalate, polyethylene, polystyrene, polypropylene, ethylene propylene copolymer or polyacetal or a laminate including a barrier layer of an impermeable polymer but is preferably of glass. The cap can be of polymeric organic material, for instance any material listed above. Preferably it is of metal but it may include a push or pull component of polymeric material.

The cap may be a crown cap, a twist-on cap or a screw-on cap, or any other conventional form of metal cap suitable for closing the bottle or jar. If the cap and/or bottle is of polymeric material, the material should have very low oxygen permeability.

The invention is of particular value when the gasket is the gasket in a metal cap to a glass bottle or jar, especially the metal cap for a beer bottle.

A gasket is normally provided between the container and the closure and this gasket is preferably formed from the composition of the invention but it is possible for the composition of the invention to be utilised elsewhere on the closure in which event the gasket-forming composition can be any conventional composition suitable for forming the gasket.

When the closure is a cap, the gasket may be an overall gasket. However generally, for both caps and can ends, the gasket is an annular gasket and may be deposited in conventional manner from the gasket-forming composition. For instance an annular gasket can be formed on a can end by being applied in liquid form as an annulus around the can end and can then be converted to solid form by drying and/or heating. The gasket-forming composition may, for this purpose, be a dispersion, latex, plastisol, or organic solution. The can end, carrying the annular gasket, is then pressed on to an appropriate sealing face around the open end of the filled container and folded around this face in conventional manner.

When the closure is a cap for a bottle or jar, the gasket-forming composition can be any of these or a plastisol, and can be applied in similar manner, but preferably the composition is a thermoplastic composition.

It may be applied as a low viscosity melt while the cap is spinning, so as to throw the composition into the form of an annulus, or it may be applied as a melt which is then moulded into the desired shape, often a disc having a thickened annular portion.

It is particularly preferred, in the invention, that the gasket on the container closure should be formed by applying the fluid or molten composition of the invention and solidifying it on the closure, the method of application and solidification generally being conventional. It is particularly preferred that the container and can end should both be of metal or the container should be of glass and the cap of metal, since the use of the defined compositions for forming the gasket then appears to give particularly beneficial results. In particular, excellent results are achievable when the container is a glass bottle and the closure is a metal cap, especially when the filling in the container is beer.

Instead of or in addition to using the fluid or meltable composition of the invention for forming the gasket, it is possible to deposit the composition elsewhere on the inner face of the closure. It may be applied as an overall coating of the inner face of the panel of the closure or it may be applied over part only of the inner face. In particular, when the panel includes one or more push or pull components defined in the panel by discontinuities or lines of weakness the composition may have been applied primarily to cover just the discontinuity or line of weakness.

For instance one type of closure, usually a can end, includes at least one, and often two, push components that are defined by partial score lines through the metal panel such that finger pressure can push a circular area of the panel into the container, so as to allow access to the contents of the container. Thus there may be a small push component to allow release of pressure and a larger push component to allow pouring of liquid from the container. Such a system is described in, for instance, DE 3,639,426. The fluid composition may be deposited as an annulus (or a disc) covering the line of weakness. The line of weakness may merely be a weakened line in the metal panel but it can be a total cut around the push component, for instance as in DE 3,639,426, in which event the push component generally has an area slightly larger than the opening in the panel that is defined by the cut line and the composition of the invention can then form a seal between the push component and the remainder of the panel of the closure.

In all instances where push or pull components are to be formed within a metal panel, there is a serious risk that the formation of the push or pull components may damage the polymeric lacquer coating that is generally present on the inner surface of the metal panel. This can expose the metal to corrosion. Application of a composition of the invention can both prevent corrosion and improve storage of fillings such as beer.

The composition of the invention may be formulated in any convenient fluid form, such as a melt, plastisol, organic solution, latex or dispersion. The main ingredients of the composition, apart from the oxygen scavenger, are normally typical of those conventionally present for the intended purpose.

The composition comprises a polymeric matrix material, that is to say polymeric material that will form the matrix of the solidified deposit. The polymeric matrix material will be selected having regard to the nature of the composition (dispersion, latex, plastisol, solution or melt) in conventional manner.

Suitable materials for use as the polymeric component of latex compositions, e.g., for can ends, are described in GB 2,084,600 and EP 0182674. Suitable polymeric materials for use when the compositions are organic solutions or aqueous dispersions are described in GB 2,084,601. Suitable materials for use when the compositions are plastisols include vinyl chloride homopolymers and copolymers. Instead of preparing such compositions as true plastisols, they may be provided as dry blends of the polymer and plasticiser.

Suitable materials for use in thermoplastic compositions include the materials proposed in GB 1,112,025 or EP 129309, 129310 or 153042. In particular, the polymeric material is generally selected from polyethylene, polypropylene, ethylene propylene copolymers, butyl rubber, styrene butadiene rubber, carboxylated styrene butadiene, polyisoprene, styrene isoprene styrene block copolymers, styrene butadiene styrene block copolymers, styrene ethylene butylene styrene block copolymers, ethylene vinyl acetate copolymers, ethylene (meth) acrylate copolymers (for instance ethylene butyl acrylate copolymers), ethylene vinyl alcohol copolymers, vinyl chloride homopolymers and copolymers, styrene acrylic polymers, polyamides, and vinyl acetate polymers, and blends of one or more of these.

Particularly preferred compositions according to the invention are thermoplastic compositions formed of ethylene vinyl acetate or polyethylene or blends thereof. The polyethylene, if used, is preferably a low density polyethylene, and may be a very low density polyethylene. The ethylene vinyl acetate copolymer, if used, preferably has a melt index in the range 1 to 15, often 3 to 15 and preferably 4 to 10.

The EVA copolymer generally contains 8 to 25%, preferably 10 to 20%, vinyl acetate. Blends of low density polyethylene with elastomers (e.g., styrene butadiene styrene, ethylene propylene or ethylene propylene diene) may be used. The amount of elastomer typically is 5 to 25%, often 10–20%, by weight of the blend.

The compositions may contain additives such as filler, slip aids, pigments, stabilisers, anti-oxidants, tackifying resins and other conventional additives in conventional amounts, depending upon the nature of the composition. If the composition is a thermoplastic composition the total amount of such additives is generally below 10%, most preferably below 3%, based on the total weight of the composition but when the composition is a plastisol, dispersion, organic solution or dispersion the amounts of additives, based on polymeric material may be higher. For instance a large amount of filler may be incorporated.

The essential feature of the invention is that the composition from which the gasket is formed contains ethylene vinyl alcohol of a type and in an amount such that the permeability of gaskets made from the composition is reduced. The reduction can be very significant, e.g., usually at least 5%, often at least 10% and frequently above 15 or 20%, often as much as 50% or more of the oxygen permeability of the same composition but in the absence of the ethylene vinyl alcohol. The permeability to other contaminating vapours is also reduced.

The amount of ethylene vinyl alcohol is usually in the range 5 to 50%, based on the weight of the other polymeric components. Amounts in the range 10 to 35%, preferably 20 to 30%, are often preferred.

The ethylene vinyl alcohol polymer preferably has a melt index (in g/10 min measured at 190° C., 2160 g) similar to the melt indices mentioned above as being preferred for the other components, e.g., in the range 1 to 15, often 4 to 10, most preferably 4 to 7. It typically has an ethylene content of 20 to 60%, generally 30 to 50%. Preferably the ethylene content is above 40%. The melting point of the polymer is generally in the range 150° to 180° C., preferably 160° to 170° C. The degree of hydrolysis of the polymer (from polyvinyl acetate) is generally above 95%.

The oxygen transmission rate of the polymer (measured at 35° C., dry, in cc.15 $\mu m/m^2$. 24 hrs.atm) is generally below 10 and preferably below 5. The water vapour transmission rate (measured at 40° C., 90% RH in g.30 $\mu m/m^2$. 24 hrs) is generally below 50, preferably from 10 to 40.

A composition that gives reduced permeability can usually be made by simple melt blending of the matrix polymer and the ethylene vinyl alcohol polymer, especially when the matrix polymer has a melt index similar to that of the ethylene vinyl alcohol polymer. However in a few instances adequate reduction in permeability may not be obtained by simple mixing. This may be due to the blend being non-homogeneous. In these circumstances, permeability can usually be reduced either by melt blending under increased shear or by the inclusion of a tie resin, or both. Suitable tie resins for this purpose are materials of the type known for promoting bonding of polymeric films, especially a film of ethylene vinyl alcohol polymer with a film of polymeric matrix material. The amount of tie resin typically is 2 to 10%, based on the weight of matrix polymer. Suitable tie resins are often based on ethylene vinyl acetate polymers.

By the invention it is possible to greatly prolong the shelf life of the beer or other content of the sealed container so that the degree of oxygen contamination of metal-capped glass bottles after, say, six months is still less than the degree conventionally achieved, in the absence of the ethylene vinyl alcohol, in less than two months. In particular, by the invention it is easily possible to ensure that there is substantially no oxygen contamination of the beer for at least four months after pasteurisation.

The following are some examples. In these, the oxygen permeability that is quoted is the mean value for a layer 500 $\mu m$ thick measured in cc/m²/24 hrs. All parts are parts by weight.

EXAMPLE 1

A gasket-forming composition is formed of 100 pbw matrix material and 25 pbw ethylene vinyl alcohol polymer.

The matrix material is formed of 85 pbw low density polyethylene of melt index 7.0 and 15 pbw ethylene propylene rubber of Mooney value 40 to 50 (1+4 at 125° C.). The ethylene vinyl alcohol polymer has an ethylene content of 44%, melting point 164° C., melt index 5.5, density 1.14, oxygen transmission rate about 3 to 5 and water vapour transmission rate about 15 to 30 (the measurement conditions and units all being as defined above).

Oxygen permeability of the matrix material alone was 395. The permeability of the blend after conventional melt mixing was 190 but after high shear mixing was 215. When 6 pbw of a tie resin was included the permeability was 240 by ordinary mixing or 230 by high shear mixing. This shows that typical blends of matrix material and ethylene vinyl alcohol can give optimum permeability without special mixing or other additives.

A glass beer bottle can be sealed with a metal cap into which has been moulded a gasket formed from the blend formed by adding the ethylene vinyl alcohol polymer alone with ordinary mixing. The storage life of the beer will be found to be greatly improved compared to the shelf life when the gasket does not contain ethylene vinyl alcohol.

EXAMPLE 2

The process of example 1 was repeated but using a different ethylene propylene rubber. In this instance the permeability of the matrix material alone was 400. When ethylene vinyl alcohol polymer was added by itself under high shear mixing the permeability was 230 but when it was added with the tie resin the permeability was 116 after ordinary mixing and 210 after high shear mixing. This demonstrates that excessive shear during mixing can be undesirable, especially when a tie resin is present.

EXAMPLE 3

The process of example 1 was repeated using a dispersion of ethylene propylene diene copolymer in high density polyethylene, instead of the ethylene propylene copolymer. The permeability of the matrix material alone was 318. After adding the ethylene vinyl alcohol polymer with high shear mixing the permeability was 195 and after adding the tie resin to it, it was 90 after ordinary mixing and 158 after high shear mixing.

EXAMPLE 4

The process of example 1 was repeated but using a styrene butadiene styrene rubber as the matrix material. The addition of the ethylene vinyl alcohol by conventional mixing caused the permeability to increase above its initial value of 258, but the incorporation of 6 pbw tie resin caused the permeability to drop to 127.

What is claimed:

1. A container closure having reduced oxygen permeability consisting essentially of a metal closure, the closure having at least one surface coated with a sealing composition comprised of a polymer matrix blend of polyethylene and an elastomer selected from the group consisting of, carboxylated styrene butadiene polymers, ethylene propylene copolymers, ethylene propylene diene copolymers and blends thereof and from about 5 to about 50% by weight of the matrix of an ethylene vinyl alcohol polymer.

2. The closure of claim 1 wherein the coating is in the form of a gasket.

3. The closure of claim 1 wherein the coating has an oxygen transmission rate (measured at 35° C., dry, in cc.15 $mm/m^2$.24 hrs.atm) is below 10 and the water vapour transmission rate (measured at 40° C., 90% RH in g.30 $mm/m^2$.24 hrs) is below 50.

4. The closure of claim 1 wherein the oxygen transmission rate is below 5 and the water vapour transmission rate is from 10 to 40.

5. The closure of claim 1 wherein the ethylene vinyl alcohol polymer has a melt index (g/10 min measured at 190° C., 2160g) in the range 1 to 15.

6. The closure of claim 5 wherein the melt index of the ethylene vinyl alcohol polymer and the melt index of the remainder of the components of the composition are each in the range 4 to 10.

7. The closure of claim 1 wherein the ethylene vinyl alcohol polymer has an ethylene content of 30 to 50% and a melting point of 150° to 180° C.

8. The closure of claim 1 further comprising about 2 to about 10% by weight of a tie resin.

9. The closure of claim 1 wherein the polymer matrix and the ethylene vinyl alcohol polymer are subjected to a high shear mixing.

10. A container closure having reduced oxygen permeability consisting essentially of a metal closure, the closure having at least one surface coated with a gasket comprised of a thermoplastic polymer matrix of polyethylene and ethylene propylene copolymers and from about 5 to about 50% by weight of the matrix of an ethylene vinyl alcohol polymer.

11. The closure of claim 10 wherein the amount of ethylene vinyl alcohol polymer is from about 10 to 35% by weight of the matrix.

12. The closure of claim 10 wherein the amount of ethylene vinyl alcohol is from about 20 to 30% by weight of the matrix.

13. The closure of claim 10 further comprising a tie resin present in an amount from about 2 to about 10% by weight of the matrix.

14. The closure of claim 10 wherein the matrix is subjected to a high shear mixing.

15. A container closure having reduced oxygen permeability comprising a metal closure, the closure having a gasket on at least one surface, the gasket being comprised of a matrix formed of a blend of polyethylene and an elastomer selected from the group consisting of styrene butadiene styrene polymers, ethylene propylene copolymers, ethylene propylene diene copolymers and blends thereof; and an ethylene vinyl alcohol polymer.

16. The closure of claim 15 wherein the elastomer is present in amount from about 5 to about 25% by weight of the blend and the ethylene vinyl alcohol polymer is present in amount from about 5 to about 50% by weight of the matrix.

17. The closure of claim 15 wherein the blend is subjected high shear mixing before being formed into a gasket.

18. The closure of claim 15 further comprising from about 2 to about 10% by weight of the matrix of a tie resin.

* * * * *